United States Patent [19]
Kobayashi et al.

[11] Patent Number: 4,749,439
[45] Date of Patent: Jun. 7, 1988

[54] METHOD FOR MANUFACTURING THIN FILM MAGNETIC HEAD

[75] Inventors: Tetsuo Kobayashi, Kanagawa; Sadanori Nagaike, Odawara, both of Japan

[73] Assignee: Hitachi, Ltd., Tokyo, Japan

[21] Appl. No.: 758,464

[22] Filed: Jul. 24, 1985

[30] Foreign Application Priority Data

Jul. 25, 1984 [JP] Japan .................. 59-152820

[51] Int. Cl.⁴ .................. B44C 1/22; C23F 1/00
[52] U.S. Cl. .................. 156/645; 156/655
[58] Field of Search .............. 156/643, 645, 651, 652, 156/655, 657

[56] References Cited

U.S. PATENT DOCUMENTS

| | | | |
|---|---|---|---|
| 4,425,183 | 1/1984 | Maheras et al. | 156/655 |
| 4,528,065 | 7/1985 | Yamazaki | 156/643 |
| 4,560,435 | 12/1985 | Brown et al. | 156/652 |
| 4,560,436 | 12/1985 | Bukhman et al. | 156/655 |

FOREIGN PATENT DOCUMENTS

58-98822 6/1983 Japan .
58-111116 7/1983 Japan .

*Primary Examiner*—S. Leon Bashore
*Assistant Examiner*—Michael K. Boyer
*Attorney, Agent, or Firm*—Antonelli, Terry & Wands

[57] ABSTRACT

A thin film magnetic head including a first magnetic material layer, a gap material layer formed on the first magnetic material layer, an inorganic insulating layer having a generally trapezoidal shape in cross section and formed on the gap material layer, a second magnetic material layer formed on the organic insulating layer and conductor coils formed on the gap material layer within the organic insulating layer, in which the gap material layer is tapered by an etching process with the organic insulating layer of the generally trapezoidal shape in cross section used as a mask, and thereafter the organic insulating layer is etched so that the organic insulating layer is caused to stand back from the gap material layer a predetermined distance in the direction away from the air bearing surface of the head which is opposed to a recording medium.

2 Claims, 2 Drawing Sheets

C⊗

C⊗

METHOD FOR MANUFACTURING THIN FILM MAGNETIC HEAD

BACKGROUND OF THE INVENTION

The present invention relates to a thin film magnetic head, and, in particular, to its manufacturing method which is suitable for high precison gap depth machining.

When a conventional thin film magnetic head is subjected to gap depth machining, the machining distances are defined on the basis of a sensing pattern of a gap depth machining operation (hereinafter, referred to as the sensing pattern) instead of the actual device. Accordingly, deviations between the actual device and the sensing pattern are incurred. Depending upon precision in alignment of devices, for example, gap depth dimensions are disadvantageously deviated from the typical value. A large gap depth dimension results in an insufficient recording magnetic field for the recording medium. Effecting gap depth machining further beyond the zero position where the gap depth is zero increases the gap length and exposes an organic resin to the medium side face, resulting in a poor crash resistance, i.e., a poor resistance to crash due to collision between the head and a disk.

A method for improving the crash resistance was proposed in unexamined Japanese Patent Publication No. 98822/83. This method, though relating to a thin film head of the type having a double layer coil, will now be described by referring to FIG. 1. FIG. 1 is a sectional view of a thin film magnetic head having two coil layers. After a base film 12 made of alumina or the like has been formed on a substrate 11, a lower magnetic substance 13, an insulative layer 20, a first coil layer 15, an insulative interlayer film 16 of an organic resin, a gap material 14 of an inorganic material such as alumina, a second coil layer 15, an insulative interlayer film 19 of an organic resin, and an upper magnetic substance 17 are successively laminated. Since the front end of the insulative interlayer film 16 between the gap material 14 and the insulative layer 20 stands back from the zero position of magnetic gap depth (position A'), the organic resin is not exposed to the air bearing surface, i.e., to the medium side face even if the laminate is subjected to machining from the medium side face to the position A' in a direction C', resulting in an improved crash resistance. Further, in FIG. 1, the insulative interlayer film 16 between the gap material 14 and the insulative layer 20 is not caused to stand back so much as the film 19, partly because the film 16 is covered by the gap material 14 and partly because even if it were caused to stand back, nothing would be provided for facilitating detection of the machining distance thereby. In a method disclosed in unexamined Japanese Patent Publication No. 111116/83, an insulative interlayer film between upper and lower magnetic substances is so formed by laminating an inorganic insulative material and an organic insulative material that only the inorganic insulative material is exposed to the medium side face when the laminate is subjected to machining as far as a position where the magnetic gap depth becomes zero. As a result, the crash resistance is improved.

However, it is still difficult to stably produce a thin film magnetic head which is small in gap depth dimension, high in the gap depth accuracy, and excellent in crash resistance.

SUMMARY OF THE INVENTION

An object of the present invention is to provide a manufacturing method of a thin film magnetic head whereby it becomes possible to manufacture, with a high reproducibility, thin film magnetic heads which are small in the gap depth dimension, high in the gap depth precision, and excellent in crash resistance.

In accordance with one aspect of the present invention, a gap material is etched with an organic insulative film used as a mask, and thereafter the organic insulative film is etched so that the organic insulative film stands back from the gap material in the direction away from the air bearing surface of the head.

DESCRIPTION OF THE PREFERRED EMBODIMENTS

Figure 1:
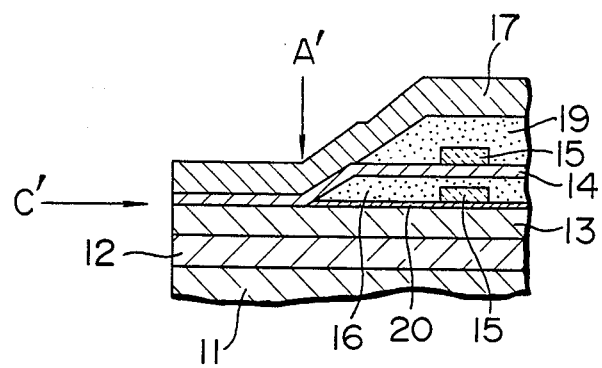
FIG. 1 is a sectional view of a conventional thin film magnetic head.

Embodiments of the present invention will now be described by referring to the drawings.

FIGS. 2a–2d are sectional views for illustrating a part of the manufacturing process of the present invention.

Figure 2A:
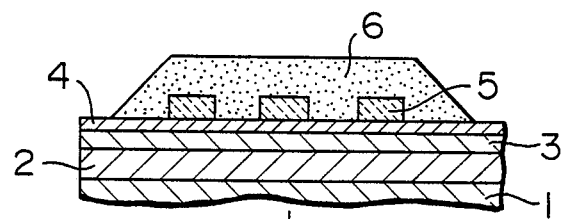
FIGS. 2a to 2d are sectional views of an embodiment of a thin film magnetic head according to the present invention for illustrating the manufacturing process thereof.

In FIG. 2a, a base film 2 is formed by sputtering alumina on a substrate 1 made of ceramics or the like. By using sputtering and etching, a lower magnetic substance 3 of permalloy, a gap material 4 of alumina, and a conductor coil 5 of copper or aluminum are then formed. Between conductors of the conductor coil 5 and on the conductor coil 5, an organic resin film is formed by means of spin application and thermal hardening. By means of a wet etching using a negative photoresist, the film is subjected to patterning to form an organic insulative film 6 having a taper angle of 30° to 50°, so that it is generally trapezoidal in cross section.

Figure 2B:
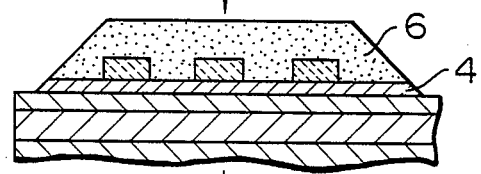

As illustrated in FIG. 2b, the gap material 4 is then etched with the organic insulative film 6 used as the mask. This method may be either of wet type or dry type. For the gap material 4 to have a taper, however, it is desirable that the gap material 4 has the same etching rate as that of the organic insulative film 6.

For an etching operation by using an ion milling unit under such conditions that the $CF_4$ pressure is $1.6 \times 10^{-4}$ Torr, acceleration voltage is 500 V, and ion incident angle is 60°, the selective etching ratio of the gap material ($Al_2O_3$) to the organic insulative film (PIQ) will be approximately 6:5. Thus, it is possible to transcribe the taper angle of the organic insulative film onto the gap material 4.

Figure 2C:
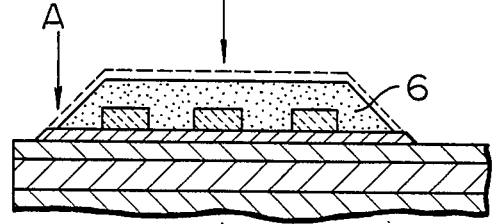
Figure 2D:
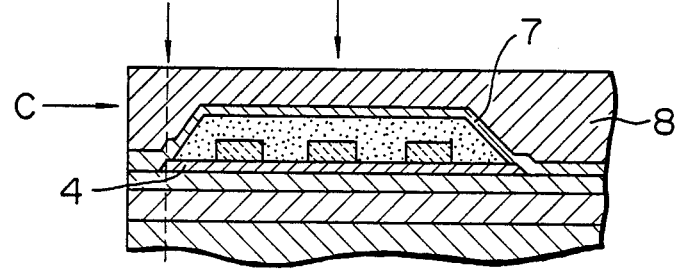

As illustrated in FIG. 2c, the organic insulative film 6 is etched again. This aims at causing the front end point of the organic insulative film (gap depth zero position) to stand back from the gap depth machining stop point. It is possible to employ any method whereby only the organic insulative film 6 can be selectively etched. By etching the organic insulative film 6 for 10 minutes by means of an ion milling unit under such conditions that the $O_2$ pressure, acceleration voltage, and ion incident angle are respectively $1.6 \times 10^{-4}$ Torr, 400 V, and 90°, for example, the organic insulative film 6 stands back from the gap material pattern by 2 to 3 μm in the direction away from the medium side face or the air bearing surface of the head. Accordingly, a point A illustrated in FIG. 2c becomes the front end point of the organic insulative film and becomes the gap depth zero position. And the standback distance of the organic insulative film becomes the gap depth dimension. (The original position is represented by the broken lines). As illustrated in FIG. 2d, an upper magnetic substance 7 of permalloy and a protective film 8 of alumina are successively formed by using sputtering and ething, resulting in a completed thin film head device.

By effecting a gap depth machining in the direction C illustrated in FIG. 2d from the medium face side and grinding the gap material 4 as far as such a point that the gap material 4 exhibits the necessary gap length, a complete thin film magnetic head is obtained.

By manufacturing a thin film head in accordance with this embodiment, the gap depth can be controlled with high precision by changing the stand-back distance of the organic insulative film 6 and the gap depth machining can be stopped with high precision by changing the gap length. Further, the gap depth can be reduced without exposing the organic insulative film 6.

Since the gap depth machining can be conducted while observing the gap length of the actual device owing to the provision of the above-mentioned standback distance, the sensing pattern becomes necessary. The deviation between the actual device and the sensing pattern and alignment precision between devices causes no longer trouble. Accordingly, it is possible to obtain a wide effective device area in the substrate face. Since the organic insulative film 6 is formed in a taper shaped pattern and then etched again to stand back, it is possible to manufacture a thin film magnetic head having a uniform gap depth dimension.

Obviously, the present invention is well applicable to a case in which a plurality of thin film magnetic head structures as show in FIG. 2d are fabricated on a single substrate and then machined or ground at one time.

Figure 3:
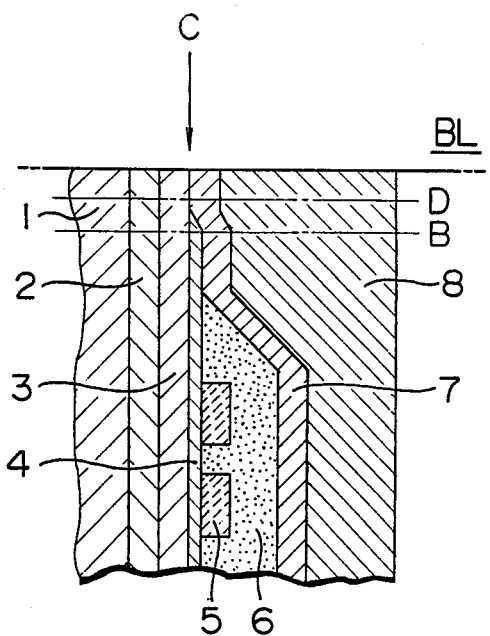
FIGS. 3, 4a and 4b are diagrams for illustrating another embodiment of the present invention.
Figure 4A:
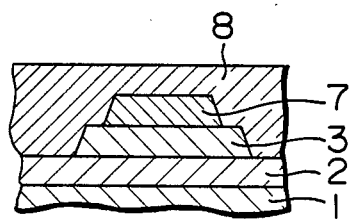
Figure 4B:
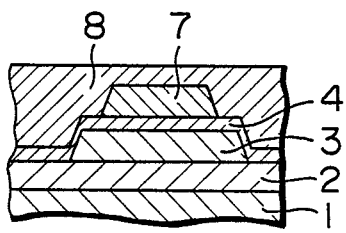

Namely, after a plurality of thin film magnetic head structures are formed on a single substrate, it is separated into, for example, plural bars or blocks BL and are ground in the direction C, as shown in FIG. 3. In the grinding or maching operation, when the operation proceeds up to the intermediate level D, the upper and lower magnetic substances 7 and 3 as exposed are observed as being contacted to each other as shown in FIG. 4a, while when the operation reaches the eventual or destination level B, the upper and lower magnetic sustances as exposed are now observed as being isolated from each other by the gap material 4 to thereby establish a desired gap length (which is equal to the thickness of the gap material 4) and a desired gap depth as shown in FIG. 4b. Thus, by performing the machining operation up to a level where a desired gap length and a desired gap depth, a plurality of thin film magnetic heads each having almost the same desirable gap length and almost the same desirable gap depth are manufactured with a high reproducibility.

As has been described above, according to the present invention, it is possible to manufacture, with a high reproducibility, thin film magnetic heads which are small in the gap depth dimension, high in the gap depth dimension precision, and uniform in electrical characteristics. Therefore, a thin film magnetic head which is high in performance and reliability can be manufactured with a high yield rate.

What is claimed is:

1. A method for manufacturing a thin film magnetic head comprising the steps of:

forming a lower magnetic layer over a substrate, said substrate serving to support said lower magnetic layer;

forming a gap layer on said lower magnetic layer in such a manner that one end portion of said gap layer stands back from one underlying end portion of said lower magnetic layer to at least partly expose said one underlying end portion of said lower magnetic layer;

forming a conductor coil on said gap layer;

forming an insulating layer on said gap layer and on said conductor coil so that said conductor coil is buried in said insulating layer, wherein one end portion of said insulating layer overlies said one end portion of said gap layer;

removing by selectively etching a part of said one end portion of said insulating layer which overlies said one end portion of said gap layer so that said one end portion of said insulating layer stands back from said one end portion of said gap layer to at least partly expose said one end portion of said gap layer;

forming an upper magnetic layer on said insulating layer, the exposed part of said one underlying end portion and another underlying portion of said lower magnetic layer and the exposed part of said one end portion of said gap layer so that said upper magnetic layer is in contact with said lower magnetic layer at said one underlying end portion and at said another underlying portion of said lower magnetic layer across said conductor coil from said one underlying end portion;

forming a protective film over said upper magnetic layer; and grinding one end of the resulting laminate assembly which includes said one underlying end portion of said lower magnetic layer until said one end portion of said gap layer is exposed, whereby a gap depth and a gap width of the magnetic head can be accurately defined.

2. A method according to claim 1, wherein said gap layer is made of an inorganic insulating material and said insulating layer is made of an organic material.

* * * * *